C. C. SILL.
WHEEL FOR VEHICLES.
APPLICATION FILED AUG. 7, 1911.
1,062,260.
Patented May 20, 1913.
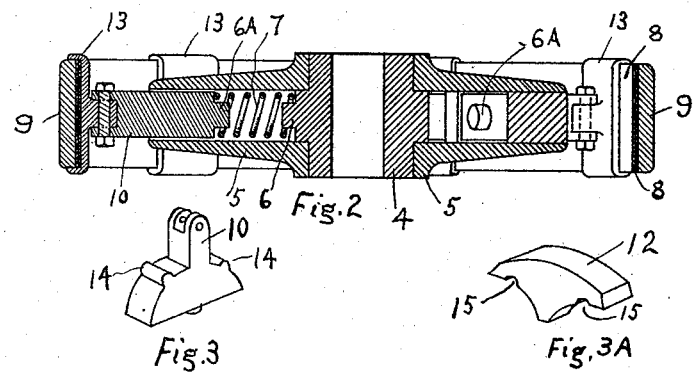
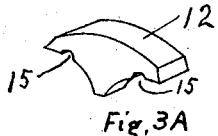
WITNESSES:
INVENTOR
Charles Calvin Sill
BY
ATTORNEY

UNITED STATES PATENT OFFICE.

CHARLES CALVIN SILL, OF SEATTLE, WASHINGTON.

WHEEL FOR VEHICLES.

1,062,260.      Specification of Letters Patent.      Patented May 20, 1913.

Application filed August 7, 1911. Serial No. 642,680.

*To all whom it may concern:*

Be it known that I, CHARLES CALVIN SILL, a citizen of the United States, residing at Seattle, in the county of King and State of Washington, have invented a new and useful Wheel for Vehicles, of which the following is a specification.

My invention relates to wheels adapted for vehicles such as are generally drawn by horses but more particularly it relates to improvements in wheels adapted for automobiles, and the object of my invention is to provide wheels which shall have all the advantages possessed by wheels which are supplied with pneumatic rubber tires and which may be made at a much less cost than wheels having such pneumatic tires.

Another object of my invention is to provide wheels that shall be stronger and more durable than are wheels heretofore employed on automobiles.

I attain these objects by constructing wheels in accordance with plans illustrated in the accompanying drawings in which—
Figure 1 is a diagrammatic view in elevation of parts of my invention while Fig. 2 is a cross-sectional view of same on broken line x—x of Fig. 1. Fig. 3 and Fig. 3ᴀ are perspective views showing details of the same.

Similar reference numbers indicate similar parts throughout the different views.

A wheel hub 4 is adapted to revolve and run on an axle bearing of a vehicle. Mounted on this hub 4 near each of its ends is a flange 5 which with the hub 4 forms a wheel frame. On the hub 4 between the two flanges 5 are a number of flattened surfaces or faces in the center of each of which is a projection or boss 6 adapted to retain and keep in position in its seat a spiral spring 7 which is disposed on said boss 6 to extend radially from the hub 4. Concentrically disposed around the wheel frame comprising the hub 4 and flanges 5 is a wheel-rim 8 composed of several turns or convolutions of spring steel riband of such suitable width and thickness as will give it a great tendency to retain the form of a true circle whatever be the weight bearing upon the axle upon which the wheel is employed.

Encircling the wheel-rim 8 and closely fitting thereto is an elastic or flexible tire 9 of suitable material, as of vulcanized rubber, leather or a composition of vulcanized rubber and textile fabrics.

The wheel-rim 8 is maintained normally in a concentric position with relation to the hub 4 by the several wheel-rim supports 13 each of which is connected by a hinge-like joint with a movable spoke 10 which projects radially from the space between the flanges 5. The spokes 10 are thrust outwardly from the hub 4 by force of the spiral springs 7 which extend from hub 4 to the inner enlarged end of said spokes 10 to cause the enlarged inner portion of each spoke 10 to engage with stop-blocks 12 which are disposed and fixed between contiguous spokes within the space between the flanges 5.

A boss 6ᴀ projects inwardly from the central portion of the surface of the inner end of each spoke 10 which, with the boss 6 on the hub 4, retains its spring 7 in its position.

Referring to Fig. 3 which is a perspective view of one of the spokes 10, it will be seen that the enlarged lower portion of each is provided with a transverse ridge 14 on each side of the upwardly projecting portion, and as seen in Fig. 3ᴀ, which is a perspective view of one of the stop-blocks 12, such stop-blocks are provided with two transverse slots 15 which are adapted by their form and location to receive and engage with the transverse ridges 14 on the said spokes 10. These slots 15 and ridges 14 serve, in a manner analogous to the action of dowel pins, to maintain the spokes 10 in a true radial direction from hub 4 when said spokes 10 are in their outermost position.

Having thus described and illustrated my invention as embodied in a vehicle wheel, its mode of operation will readily be understood to be as follows: When but little weight is imposed on the wheel, the springs 7 interposed between the hub 4 and the inner ends of spokes 10, or the springy quality of of the wheel-rim 8, will tend to maintain the wheel-rim 8 in a practically true circular form and in a concentric relation with the hub 4. When, however, an increased weight bears on the hub 4 by reason of increased load on the axle of the vehicle then the springs 7 or between the hub 4 and the spokes nearest the surface of the road way at any given time and also the springy wheel-rim 8 will give or be compressed whereby, as the wheel rolls along the road way, and all the effects and advantages of a wheel having a pneumatic tire will be realized,

What I claim is:

In a wheel for vehicles, the combination with a flexible wheel-rim made of a plurality of convolutions of spring-steel ribbon to adopt it normally to maintain the form of a true circle, of a hub provided with two flanges, movable radial spokes provided with enlarged inner ends and disposed to project outwardly from the space between said flanges, stop-blocks fixed between said flanges and between adjacent spokes normally to engage with the enlarged inner end of said spokes to limit their outward movement, elastic means disposed between said hub and the inner end of each of said spokes, a wheel-rim support hingedly connected with the outer end of each of said spokes and disposed to engage with said wheel-rim, whereby said wheel-rim normally may be maintained in a position concentric with the axis of said hub, and a flexible tire of suitable wearing material mounted on said wheel-rim.

In witness whereof, I have hereunto set my hand this 12th day of June, 1911, at Seattle, Washington.

CHARLES CALVIN SILL.

Witnesses:
JAMES E. SPROLL,
ROGER WARD SHOTWELL.

Copies of this patent may be obtained for five cents each, by addressing the "Commissioner of Patents, Washington, D. C."